UNITED STATES PATENT OFFICE.

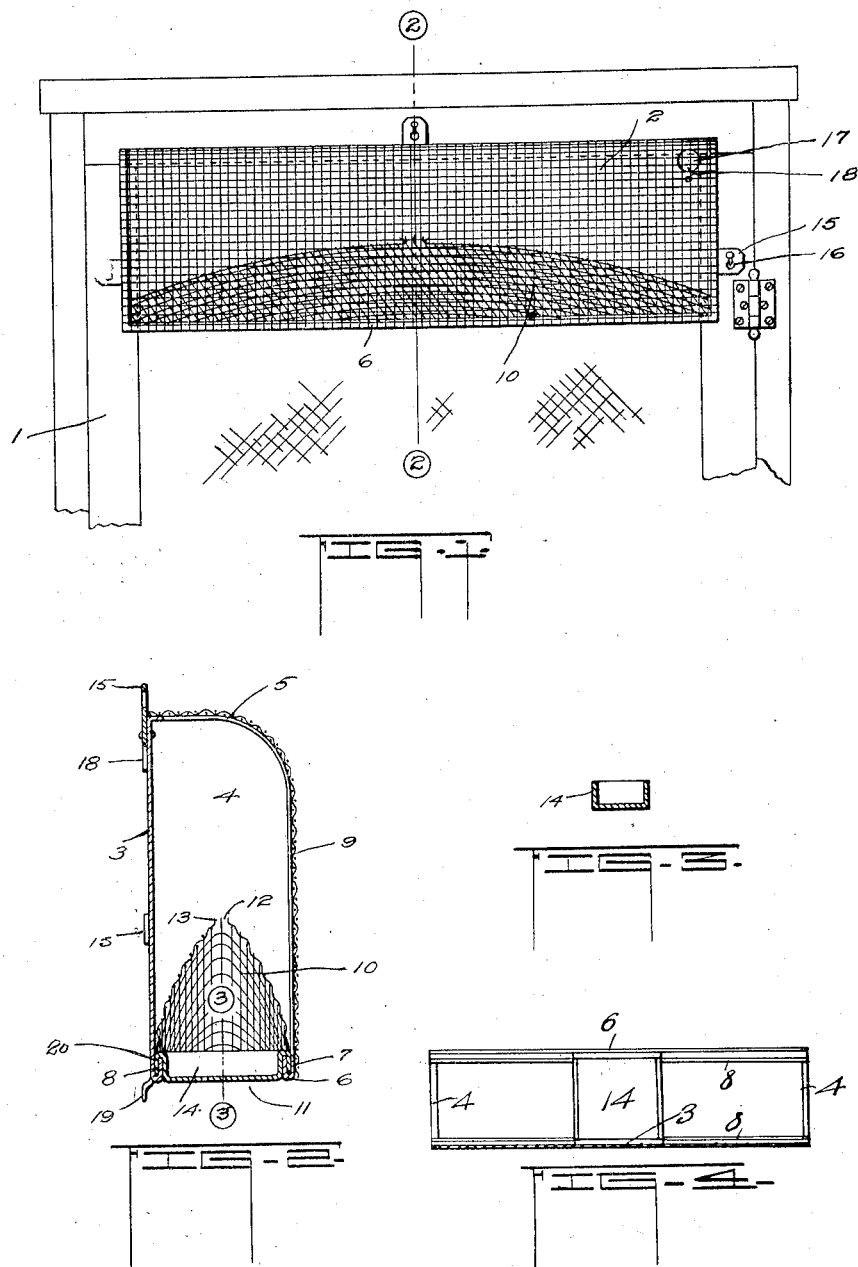

FRED O. TIBBETTS, OF HENRY, ILLINOIS.

FLYTRAP.

1,338,113.      Specification of Letters Patent.      Patented Apr. 27, 1920.

Application filed April 17, 1916. Serial No. 91,612.

*To all whom it may concern:*

Be it known that I, FRED O. TIBBETTS, a citizen of the United States, a resident of Henry, in the county of Marshall and State of Illinois, have invented new and useful Improvements in Flytraps, of which the following is a specification.

My invention relates to improvements in fly traps and devices of like nature for trapping and collecting flies, insects and the like and the principal object of this invention is the provision of a device which may be hung or supported in position at or near the top of a door, window, transom or the like.

It is a well known fact that flies and other insects congregate at the upper portion of a screen-door, window and the like, and therefore, I have provided a trap which is located in that portion of the door or window so as to collect the flies.

A further object of this invention is the provision of such a device including a member adapted to be supported at or near the top of a door, window or the like, having a receiving compartment with a conical member projecting thereinto, the conical member being open at the bottom so as to admit the flies or other insects, and having a small hole or apertured opening punched through its apex by means of which the flies or other insects are admitted into the receiving compartment where they are held until removed.

To the accomplishment of the foregoing and such other objects as may hereinafter appear, my invention consists in the combination, construction and arrangement of parts hereinafter described and then sought to be defined in the appended claim, reference being had to the accompanying drawings forming a part hereof, and which shows merely for the purpose of illustrative disclosure, a preferred embodiment of my invention, it being understood that various changes may be made in practice within the scope of the claim without digressing from my inventive idea.

In the drawings—

Figure 1 represents a front elevation of a device constructed according to my invention, applied to a screen-door or window;

Fig. 2 is a partial transverse cross section taken substantially on line 2—2 of Fig. 1;

Fig. 3 is a vertical section taken on line 3—3 of Fig. 2 showing the bait-cup or receptacle.

Fig. 4 is a horizontal section of the trap.

Referring now to the drawings, the numeral 1 designates an ordinary screen-door or window and 2 indicates the fly trap or device constructed according to my invention. It is composed preferably of the solid metallic back 3 and sides 4, the upper edges of the latter being curved as at 5. It is also provided with the supporting and sustaining member 6 extending along the front thereof and which is bent upon itself, being substantially U shaped in cross-section as shown at 7, in Fig. 2. The bottom edge of the back is also turned or lapped upon itself as at 8, as are the bottom edges of the side members 4. The front and top portion of the structure is covered by the screening 9. This completes the construction of the body of the device forming the receiving compartment for the flies or other insects.

For the purpose of directing the flies or other insects into the receiving compartment, I provide the elongated conical member 10 which is formed preferably of netting, and the lower edges of which are secured between the portions of the U shaped strip 6 and the lapped portions 8 of the back and side members of the body of the device. This leaves the bottom of the device entirely open as at 11 to permit the entrance of flies and other insects thereinto. At the apex of this conical member I punch the aperture or opening 12, leaving the ends of the wire projecting upwardly or frayed as at 13, for the purpose of preventing the egress of the flies or other insects after their entrance into the receiving compartment. The bait-cup or receptacle 14 is provided centrally of the device, extending from the rear or back member 3 to the front or sustaining member 6, being channel shaped in cross-section as shown, and adapted to contain a substance designed to attract the flies or other insects.

For the purpose of suspending or supporting the device in position, I provide the ears 15 which are apertured as at 16 to receive the fastening means, as is well understood. In the rear or bottom member 3 I provide the opening 17 having the cover 18 for the purpose of removing the flies or other insects.

I may also provide the securing means 19 for engaging in the meshes of the screen door or window to hold the device in position. It may also be desirable to have the bait-cup removable and to that end, I provide it with the bent end members or hooks 20 which are adapted to engage in the channels of the frame members, as shown in Fig. 2.

While I have shown and described as being preferable the solid metallic backing 3, it is to be understood that I may make the entire devices of netting or reticulated material and further, that instead of having only one opening or aperture 12, I may have a plurality of apertures, leading from the directing member into the receiving compartment. Also that the directing member may be of different shape than that shown in the drawing, having for instance, a wavy top with apertures in each of the apexes.

As stated hereinbefore, the device is adapted to be supported at or near the top of the door, window, transom or the like, as it is on that portion thereof, that the flies congregate. As they naturally travel upwardly, they will pass through the aperture or opening 12 into the receiving compartment and held there until they are destroyed by some means, such as water, and removed therefrom.

The device is simple, easy and cheap to manufacture and readily placed in position, requiring no attention and efficiently collecting the flies and thereby materially aiding in general sanitary conditions.

What I claim is:

In a fly trap of the type set forth, a casing having front and rear and side walls the lower edges of each of which are inturned upwardly to provide substantially U-shaped channels which face upwardly, an insect directing member having its lower edges seated in the respective channels of the front, rear and side walls, said member having its top formed with an outlet for the insects, and a removable bait cup arranged centrally of the casing and having its sides spaced from the respective casing ends and extending across the same, said cup having its opposite ends turned downwardly to form hooks which latter are received in the respective channels of the front and rear walls of the casing and seat on the top edges of the front and rear walls of the casing so as to support the cup from said top edges of the front and rear walls of the casing.

FRED O. TIBBETTS.